(12) United States Patent
Good (10) Patent No.: US 11,808,990 B2
(45) Date of Patent: Nov. 7, 2023

(54) ARMORED CABLE AND CONNECTION FOR THE SAME

(71) Applicant: BERK-TEK LLC, New Holland, PA (US)

(72) Inventor: Paul Michael Good, New Holland, PA (US)

(73) Assignee: BERK-TEK LLC, New Holland, PA (US)

( * ) Notice: Subject to any disclaimer, the term of this patent is extended or adjusted under 35 U.S.C. 154(b) by 0 days.

(21) Appl. No.: 17/668,925

(22) Filed: Feb. 10, 2022

(65) Prior Publication Data

US 2022/0163732 A1 May 26, 2022

Related U.S. Application Data

(62) Division of application No. 17/022,753, filed on Sep. 16, 2020, now Pat. No. 11,287,580.

(51) Int. Cl.
*G02B 6/38* (2006.01)
*H01B 11/22* (2006.01)
*H01B 7/18* (2006.01)

(52) U.S. Cl.
CPC ......... *G02B 6/3825* (2013.01); *H01B 7/1865* (2013.01); *H01B 11/22* (2013.01)

(58) Field of Classification Search
CPC .................................................. G02B 6/3837
See application file for complete search history.

(56) References Cited

U.S. PATENT DOCUMENTS

| | | | |
|---|---|---|---|
| 1,808,542 A | 6/1931 | Ginsburg | |
| 2,782,060 A | 2/1957 | Appleton | |
| 2,980,450 A | 4/1961 | Lifka | |
| 3,006,664 A | 10/1961 | Appleton et al. | |
| 3,120,966 A | * | 2/1964 | Lyon ................ F16L 33/224 285/222.4 |
| 3,297,978 A | 1/1967 | Stark | |

(Continued)

FOREIGN PATENT DOCUMENTS

| | | | |
|---|---|---|---|
| CN | 111665598 A | * | 9/2020 |
| EP | 2386894 | | 11/2011 |

(Continued)

OTHER PUBLICATIONS

Gas Industry Standard GIS/F9:2020 Specification for Metric and Imperial Stainless Steel Single and Twin Ferrule Compression Fittings for Tubes, revised and updated in Jun. 2020.

(Continued)

*Primary Examiner* — Rhonda S Peace
(74) *Attorney, Agent, or Firm* — Sofer & Haroun, LLP (57) ABSTRACT

A connection arrangement is provided for connecting an armored cable to a connection piece. The arrangement has a ferrule for fitting onto the end of the armored cable, that has an abutment flange, a washer and a threaded region. The threaded region has at least a portion threaded according to a first thread standard. A lock nut is configured to fit over the armored cable, and to connect with a nut thread on the connection piece. The lock nut and the connection piece are configured to compress the ferrule therebetween forming a watertight connection. An armor of the armored cable has a least a portion of the armor threaded to match the first thread standard.

7 Claims, 9 Drawing Sheets

(56) References Cited

U.S. PATENT DOCUMENTS

| | | | |
|---|---|---|---|
| 3,393,267 A | 7/1968 | Busse | |
| 3,492,410 A | 1/1970 | Kelly | |
| 4,000,918 A | 1/1977 | Reker | |
| 4,826,540 A | 5/1989 | Mele | |
| 6,102,442 A | 8/2000 | Gretz | |
| 7,118,287 B2* | 10/2006 | Perry | G02B 6/266 |
| | | | 385/60 |
| 9,235,010 B2* | 1/2016 | Islam | G02B 6/4432 |
| 10,429,593 B2* | 10/2019 | Baca | G02B 6/3851 |
| 11,092,752 B2* | 8/2021 | Li | G02B 6/3888 |
| 11,287,580 B1* | 3/2022 | Good | H01B 7/1865 |
| 2003/0010373 A1 | 6/2003 | Anand | |
| 2003/0103731 A1 | 6/2003 | Gogte | |
| 2014/0179149 A1 | 6/2014 | Starke et al. | |
| 2014/0026532 A1 | 9/2014 | Thompson | |
| 2014/0265322 A1 | 9/2014 | Thompson | |
| 2016/0020960 A1 | 1/2016 | Wang | |
| 2016/0209601 A1 | 7/2016 | Iizumi et al. | |
| 2017/0125939 A1 | 5/2017 | Relue et al. | |
| 2017/0149232 A1 | 5/2017 | Rivest | |
| 2017/0184836 A1* | 6/2017 | Urakawa | A61B 1/00009 |
| 2020/0096138 A1* | 3/2020 | Bean | F16L 33/224 |
| 2022/0082761 A1* | 3/2022 | Good | H01B 7/1865 |
| 2022/0163732 A1* | 5/2022 | Good | H01B 11/22 |

FOREIGN PATENT DOCUMENTS

| | | |
|---|---|---|
| EP | 2902827 | 8/2015 |
| EP | 2950125 | 12/2015 |
| EP | 3339927 | 6/2018 |
| WO | 2014027259 | 2/2014 |
| WO | 2017064589 | 4/2017 |
| WO | 2017/077408 | 5/2017 |
| WO | 2020069764 | 4/2020 |

OTHER PUBLICATIONS

International Searching Authority dated Dec. 14, 2021.
International Search Report dated Dec. 14, 2021.

* cited by examiner

FIG. 1
(PRIOR ART)

| Pipe Size (inches) | TPI | Approximate Length of Thread (inches) | Approximate Number of Threads to be Cut | Approximate Total thread makeup, Hand and Wrench (inches) | Nominal Outside Diameter Pipe OD (inches) [(mm)] | Tap Drill (inches) |
|---|---|---|---|---|---|---|
| | | | NPT - American Standard Pipe Thread Taper¹⁾ | | | |
| 1/16" | 27 | | | | 0.313 | |
| 1/8" | 27 | 3/8 | 10 | 1/4 | 0.405 | R |
| 1/4" | 18 | 5/8 | 11 | 3/8 | 0.540 | 7/16 |
| 3/8" | 18 | 5/8 | 11 | 3/8 | 0.675 | 37/64 |
| 1/2" | 14 | 3/4 | 10 | 7/16 | 0.840 | 23/32 |
| 3/4" | 14 | 3/4 | 10 | 1/2 | 1.050 | 59/64 |
| 1" | 11-1/2 | 7/8 | 10 | 9/16 | 1.315 | 1-5/32 |
| 1-1/4" | 11-1/2 | 1 | 11 | 9/16 | 1.660 | 1-1/2 |
| 1-1/2" | 11-1/2 | 1 | 11 | 9/16 | 1.900 | 1-47/64 |
| 2" | 11-1/2 | 1 | 11 | 5/8 | 2.375 | 2-7/32 |
| 2-1/2" | 8 | 1 1/2 | 12 | 7/8 | 2.875 | 2-5/8 |
| 3" | 8 | 1 1/2 | 12 | 1 | 3.500 | 3-1/4 |
| 3-1/2" | 8 | 1 5/8 | 13 | 1 1/16 | 4.000 | 3-3/4 |
| 4" | 8 | 1 5/8 | 13 | 1 1/16 | 4.500 | 4-1/4 |
| 4-1/2" | 8 | | | | 5.000 | 4-3/4 |
| 5" | 8 | 1 3/4 | 14 | 1 3/16 | 5.563 | 5-9/32 |
| 6" | 8 | 1 3/4 | 14 | 1 3/16 | 6.625 | 6-11/32 |
| 8" | 8 | 1 7/8 | 15 | 1 5/16 | 8.625 | |
| 10" | 8 | 2 | 16 | 1 1/2 | 10.750 | |
| 12" | 8 | 2 1/8 | 17 | 1 5/8 | 12.750 | |
| 14" | 8 | | | | 14.000 | |
| 16" | 8 | | | | 16.000 | |

ARMORED CABLE AND CONNECTION FOR THE SAME

RELATED APPLICATION

This application is a divisional application of U.S. patent application Ser. No. 17/022,753, filed on Sep. 16, 2020, the entirety of which is incorporated by reference.

FIELD OF THE INVENTION

This application relates to connections for armored twisted-pair communication cables, fiber optic cables, and hybrid cables consisting of both copper and fiber optic elements. More particularly, the present arrangement relates to water-tight connections for armored twisted-pair communication cables, fiber optic cables, and hybrid cables consisting of both copper and fiber optic elements.

DESCRIPTION OF THE PRIOR ART

Interlocking armor added to twisted-pair, fiber optic cables, and hybrid cables provides several advantages including but not limited to mechanical protection after installation, improved installation robustness, and physical security for the cabling plant. These properties are useful for cables installed outdoors, in industrial environments, and military or other high security installations. In addition to the armor, a polymer sheathing can be added over the armor to form a water-tight cable or the cable could include water blocking gels, powders, yarns, jacketing or combinations thereof, under the armor, Terminating such a water-tight armored cable into an enclosure can be difficult to do while maintaining the water-tight seal at the junction. Ordinally, armored cable is terminated using a simple threaded/crimp style connector threaded into standard knock-outs at connector boxes, but such connectors are not water-tight.

Figure 1:
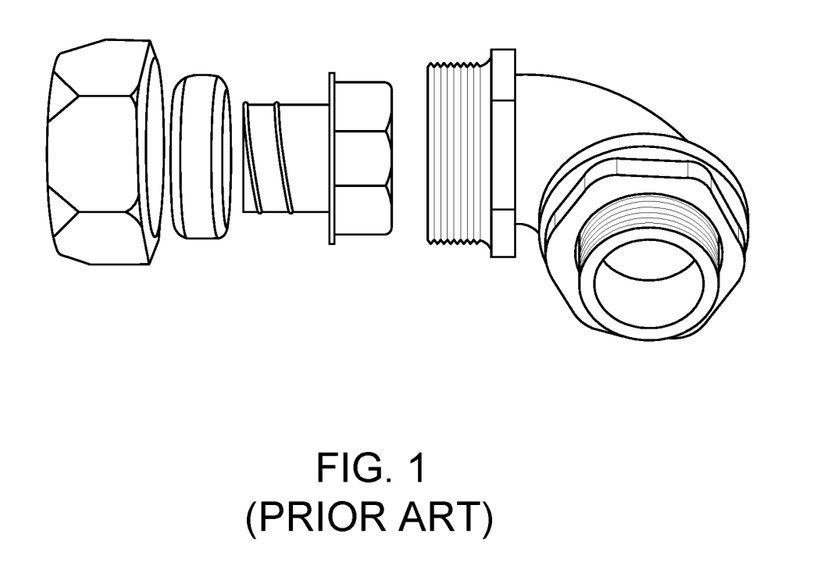
FIG. 1 is a prior art LFMC connector.
Figure 2:
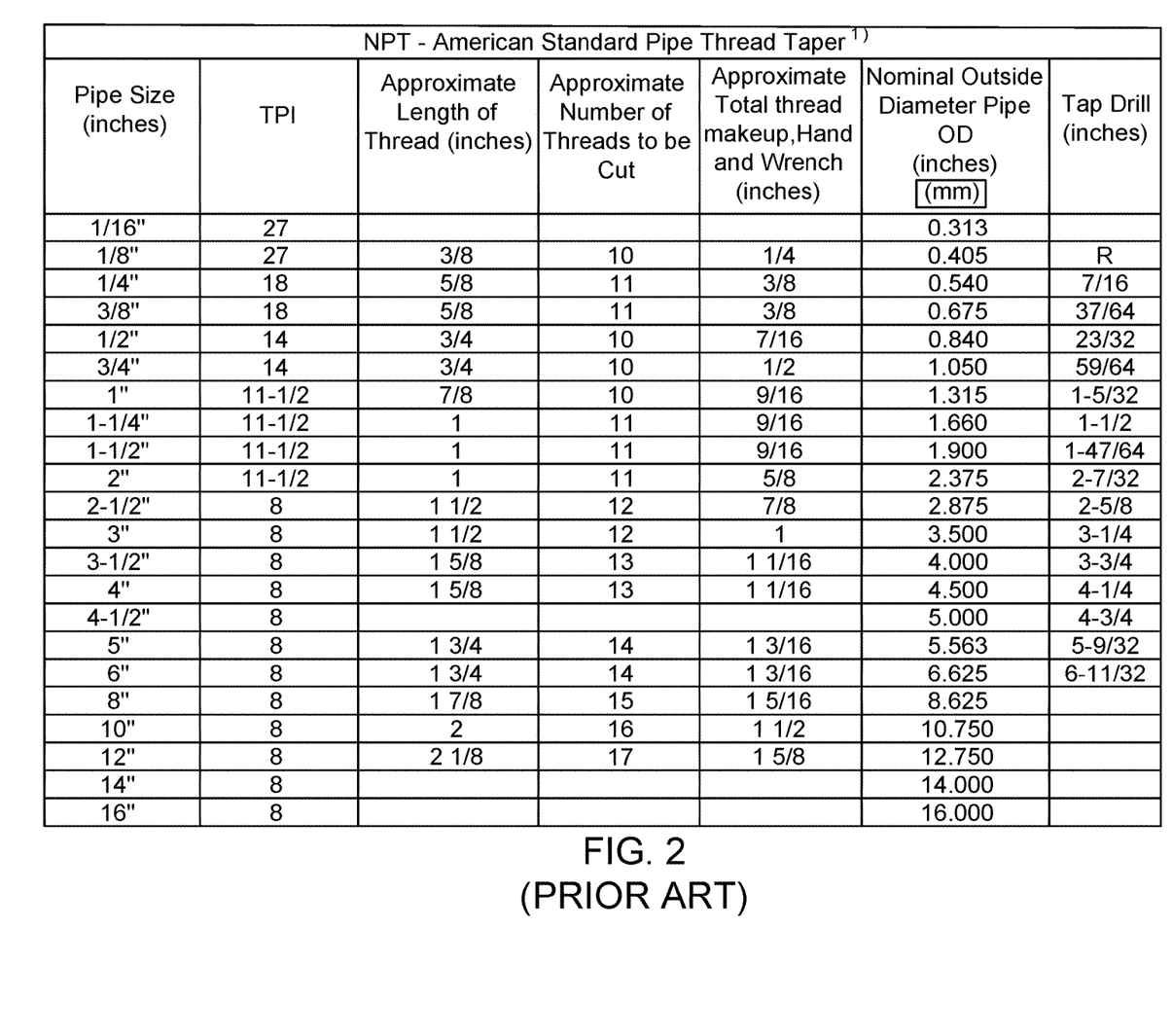
FIG. 2 is a prior art table of NPT thread standards.

The prior art also includes a number of watertight connectors for cable, including a common liquid-tight flexible metallic conduit (LFMC) connector as shown in prior art FIG. 1 but these are not generally adapted to directly connect to armored water-tight communication cables. As shown in FIG. 1, such LFMC connectors have a primary connection element (in this example an elbow connection), a washer, a lock nut and a ferrule. For this style of connector, a water-tight conduit with a threaded end is passed through the lock-nut over a corresponding threaded side of the ferrule and pressed up against the washer which in turn presses up against a larger flange of the ferrule. The lock-nut is then tightened onto the threads of the connection element and it is tightened down, compressing the ferrule, conduit and washer connection therein, to form a water-tight seal with the conduit. The ferrule threading on these prior art LFMC connectors is made according to NPT (National Pipe Tapered) thread sizing which corresponds to the ANSI/ASME B1.20.1 pipe thread standards. See the exemplary chart for ANSI/ASME B1.20.1 sizing, taper, and pitch rates in FIG. 2.

However, the armor on typical AC (aluminum clad) armored cable does not use the same pitch and tapering that is used by the NPT threaded ferrules, but rather has a tighter pitch of approximately 0.25". As such, common LFMC connectors cannot be used to directly connect with water-tight jacketed armor for twisted-pair, fiber, and hybrid cables because they are not properly retained on the LFMC ferrule.

Instead, when using armored twisted-pair, fiber, and hybrid cables the presently available common connector is an MC (metal clad) style connector to attach the armor of the cable to the enclosure. However, most of these are not water-tight and not useful in wet locations.

Figure 3:
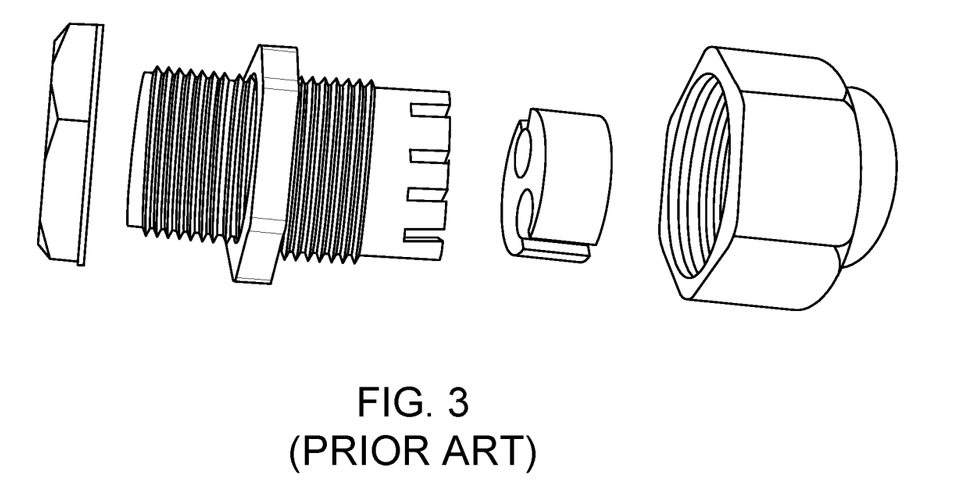
FIG. 3 is a prior art water-tight cable gland.

Another prior art solution for water-tight jacketed armor for twisted-pair, fiber, and hybrid cables involves using a cable gland with the appropriate opening size to fit around the outside of the cable as shown in FIG. 3. These glands are more likely to be found in trade sizes larger than ¾" which limits the knockouts that can be used on NEMA rated enclosures. NEMA stands for National Electrical Manufacturer Association that provide enclosure ratings for cable connections and installations and include watertight standards/ratings. For example, NEMA 4 standards provide testing parameters for water-tight connections for indoor and/or outdoor applications for protection against wind-blown dust and rain, protection of electrical components from splashing and hose-directed water, and protection from ice forming damage.

OBJECTS AND SUMMARY

The present arrangement provides several embodiments for connecting water-tight jacketed armored twisted-pair, fiber optic, and hybrid cables using existing LFMC connectors to provide watertight connections, including connections of at least NEMA 4 rating or better. The present embodiments may also allow for the bonding of the metallic armor to the enclosure via the connector.

In one embodiment, a water-tight jacketed armored twisted-pair, fiber optic, or hybrid cable is provided where the armor pitch is modified from standard AC armor pitch to match NPT threading so that existing LFMC threaded ferrules can connect and be retained on the ferrule. Such an arrangement can be used on the entire AC armor pitch for the length of the cable, or alternatively a pitch-modified segment of AC armoring can be used on a portion of the cable (or as a separated segment).

In another embodiment, a modified ferrule with a threaded region matching the pitch of AC armor pitch is provided. In this embodiment a standard LFMC connector is provided and used with a modified replacement ferrule that does not use NPT threading, but instead has threading matching AC armor pitch so that it can be used with watertight jacketed armored twisted-pair and fiber optic cables having standard AC armor.

In another embodiment, an adapter ferrule is provided where the adapter ferrule is used in conjunction with the existing LFMC ferrule. The adapter ferrule has a first smaller segment with an internal threading matching the AC armor pitch of the watertight jacketed armored twisted-pair, fiber optic, or hybrid cable. This smaller segment is fitted within the existing LFMC ferrule. The adapter ferrule also has an expanded flange with a relief cut threading adapted to be fit over the existing NPT threading of the LFMC ferrule. This adapter ferrule can be threaded onto and added to an existing LFMC style connector to allow connection with the LFMC ferrule without changing the LFMC ferrule threading or the thread pitch on the AC armor of the water-tight jacketed armored twisted-pair, fiber optic, or hybrid cable.

To this end an armored cable is provided for, fitting within a connector. The connector has a connection piece, a nut thread, a lock nut, and a ferrule, the ferrule having at least a threaded region. The threaded region has at least a portion threaded according to a first thread standard. The cable has at least one armor with a second thread standard, where at least a portion of the armor exhibits a modified thread standard matching the first thread standard.

In another embodiment, a connector is provided for connecting to an armored cable, the cable having at least one armor having a first thread standard. The connector has a connection piece, a nut thread, a lock nut, and a ferrule. The ferrule has at least a threaded region of a second thread standard, the threaded region having at least a portion threaded according the first to thread standard of the armor.

In another embodiment, an adapter ferrule is provided configured to connect between a connector and an armored cable. The connector has a connection piece, a nut thread, a lock nut, and a ferrule, the ferrule having at least a threaded region of a first thread standard. The armored cable has a second thread standard different from the first thread standard. The adapter ferrule has a small block and a large block. The small block has an internal threading matching the second thread standard of the armor, the outer dimension of which fits within the threaded region of the ferrule. The large block has a recessed thread configured to fit over the outside of the threaded region of the ferrule, the recessed thread having the same thread standard as the threaded region of the ferrule.

BRIEF DESCRIPTION OF THE DRAWINGS

The present invention can be best understood through the following description and accompanying drawing, wherein.

DETAILED DESCRIPTION

Figure 4:
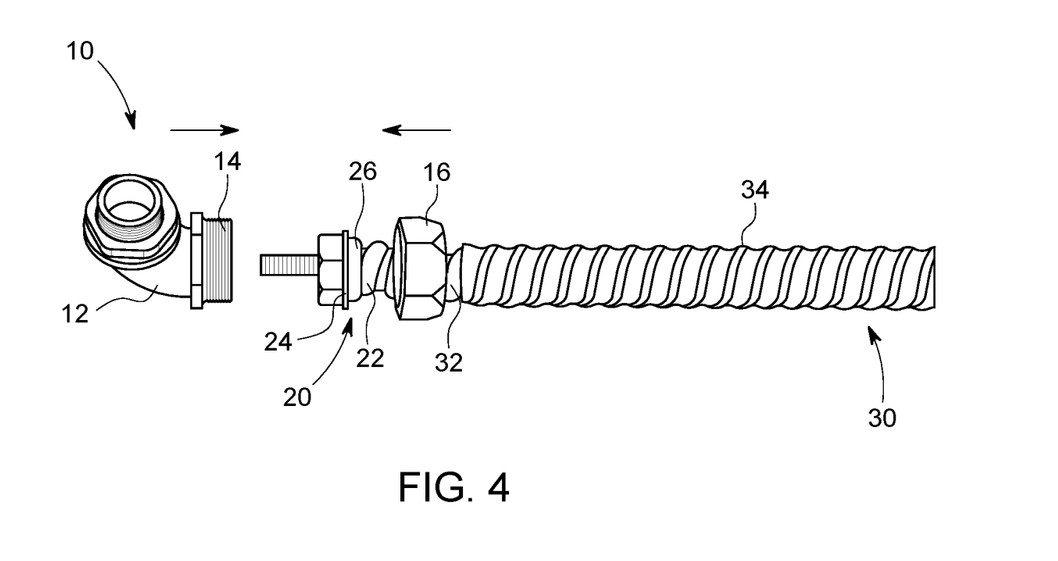
FIG. 4 illustrates a modified water-tight jacketed armored twisted-pair, fiber optic cable, or hybrid cable with an LFMC connector, in accordance with one embodiment.

In one embodiment as shown in FIG. 4 an exemplary LFMC connector 10 is shown having a connection piece 12, which is illustrated as a 90 degree elbow connection, however any shape connection piece 12 can be used (e.g. straight, offset, 45 degree, 30 degree, etc . . . ). Connection piece 12 has a nut thread region 14 for accepting a corresponding lock nut 16. The connector 10 has a ferrule 20 that fits between connection piece 12 and lock nut 16. Ferrule 20 has a threaded region 22 for accepting armor and holding a connection therewith. In this embodiment, threaded region 22 is threaded to its ordinary prior art NPT standards. Ferrule 20 further has an abutment flange 24 and a washer 26. When lock nut 16 is threaded onto threaded region 14, it compresses washer 26 against the inside of abutment flange 24 and compresses the outside of abutment flange 24 against an interior face of connector 10 (as described in more detail below). These two areas of compression create the water-tight seal with the armor 32 and physical bonding. If the connection piece 12, ferrule 20 and armor 34 are metallic, this creates an electrically conductive path for the purposes of bonding to earth. If the enclosure is grounded, then so is the cable armor.

As shown in FIG. 4, a fiber optic, twisted-pair, or hybrid cable 30 is shown having an armor 32, such as AC type aluminum helical armor, and a water-tight polymer jacket 34 thereover. It is noted that armor 32 can be interlocking aluminum, steel, corrugated, plastic, etc . . . , but for the purposes in this embodiment, armor 32 has a thread/twist rate that is modified to match the corresponding NPT type thread scale on threaded region 22 of ferrule 20. In a variation, armor 32 can maintain such modified thread/twist rate over the entire length of cable 30, or it can be only a segment of cable 30 that exhibits such modified pitch. In another variation, an empty armor tube 32 can be provided (without fibers or conductors therein), also exhibiting the modified thread/twist rate over a portion or all of the empty armor tube.

Using the first variation of armor 32 that maintains such modified thread/twist rate over the entire length of cable 30 as shown in FIG. 4, cable 30 and armor 32 is fit through lock-nut 16 and the modified pitch/thread is screwed onto threaded region 22' of ferrule 20, and pressed against washer 26 into abutment flange 24. Thereafter one would screw lock nut 16 on nut thread 14 of connection piece 12 to tighten down the entire connector 10 into a water-tight connection for cable 30.

Figure 5:
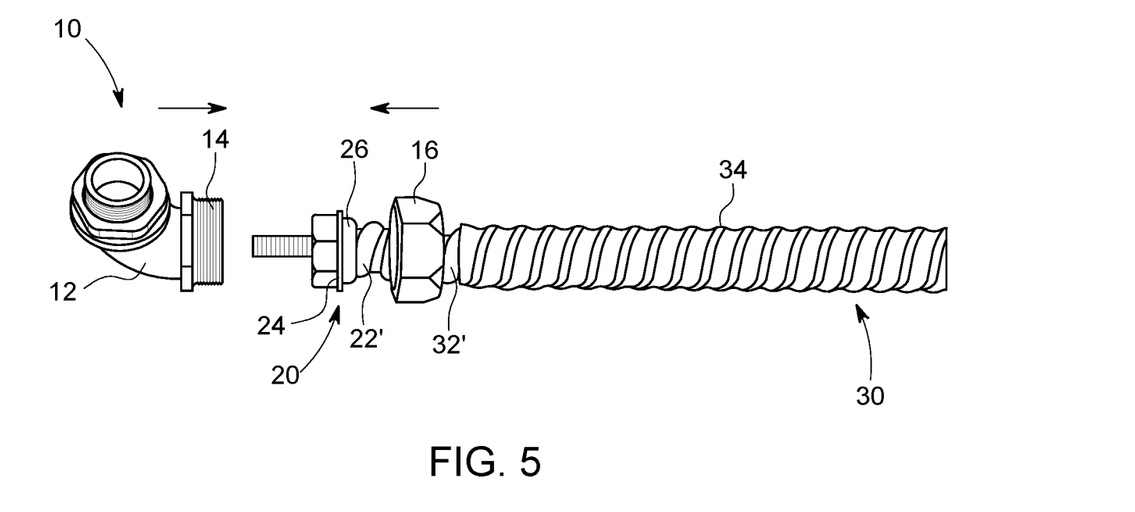
FIG. 5 illustrates a water-tight jacketed armored twisted-pair, fiber optic, or hybrid cable, with a modified LFMC connector, in accordance with one embodiment.

In another embodiment as shown in FIG. 5 connector 10 has the same connection piece 12, nut thread region 14 and lock nut 16 as well as ferrule 20, threaded region 22, abutment flange 24, and washer 26. Likewise FIG. 5 also shows fiber optic, twisted-pair, or hybrid cable 30 is shown having an armor 32' and a water-tight polymer jacket 34 thereover.

However, unlike FIG. 4, in this embodiment, armor 32' has a thread/twist rate that is ordinary AC type pitch and thread setting, but threaded region 22' on ferrule 20 is modified to match the corresponding AC type pitch. In any case, similar to FIG. 4, after armor 32' is connected to threaded region 22' screw lock nut 16 is screwed onto nut thread 14 of connection piece 12, it compresses washer 26 against the inside of abutment flange 24 and compresses the outside of abutment flange 24 against an interior face of connector 10.

Figure 6A:
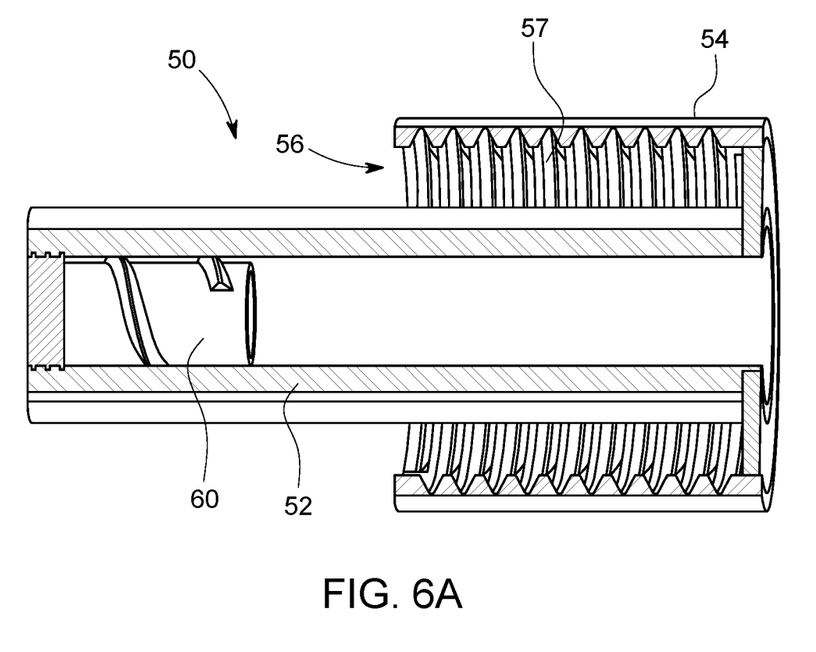
FIGS. 6A and 6B illustrates an adapter ferrule, in accordance with one embodiment.
Figure 6B:
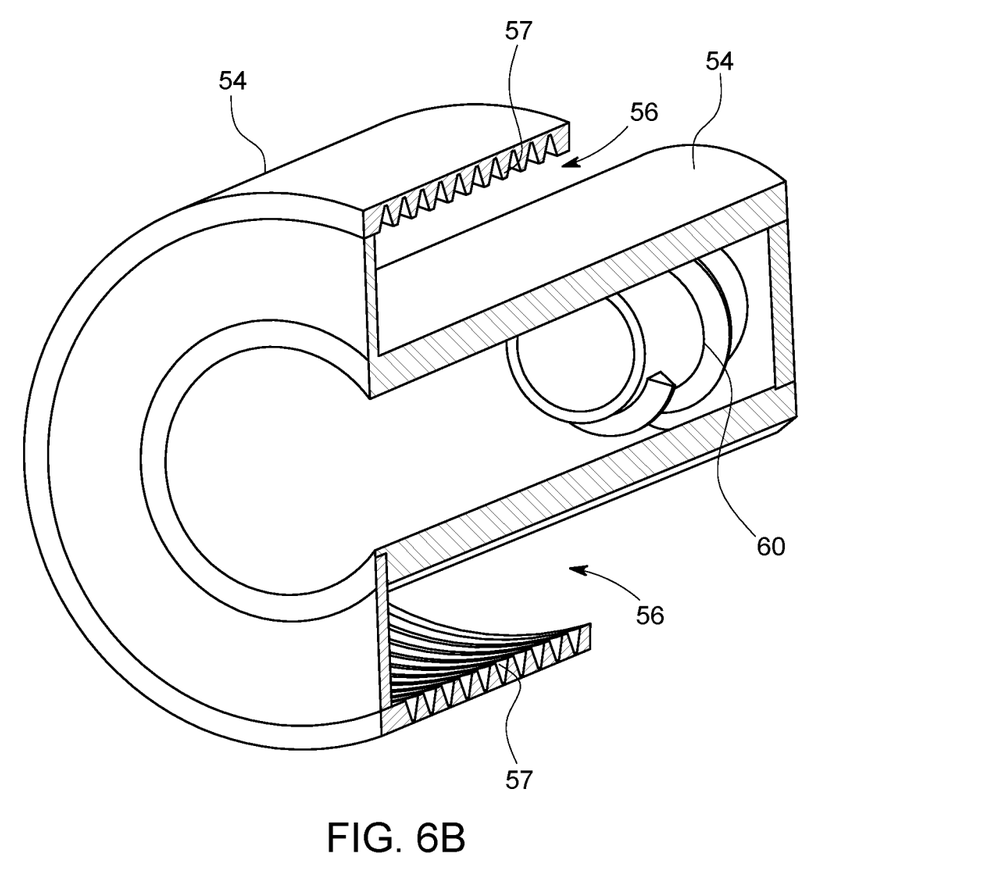
Figure 6C:
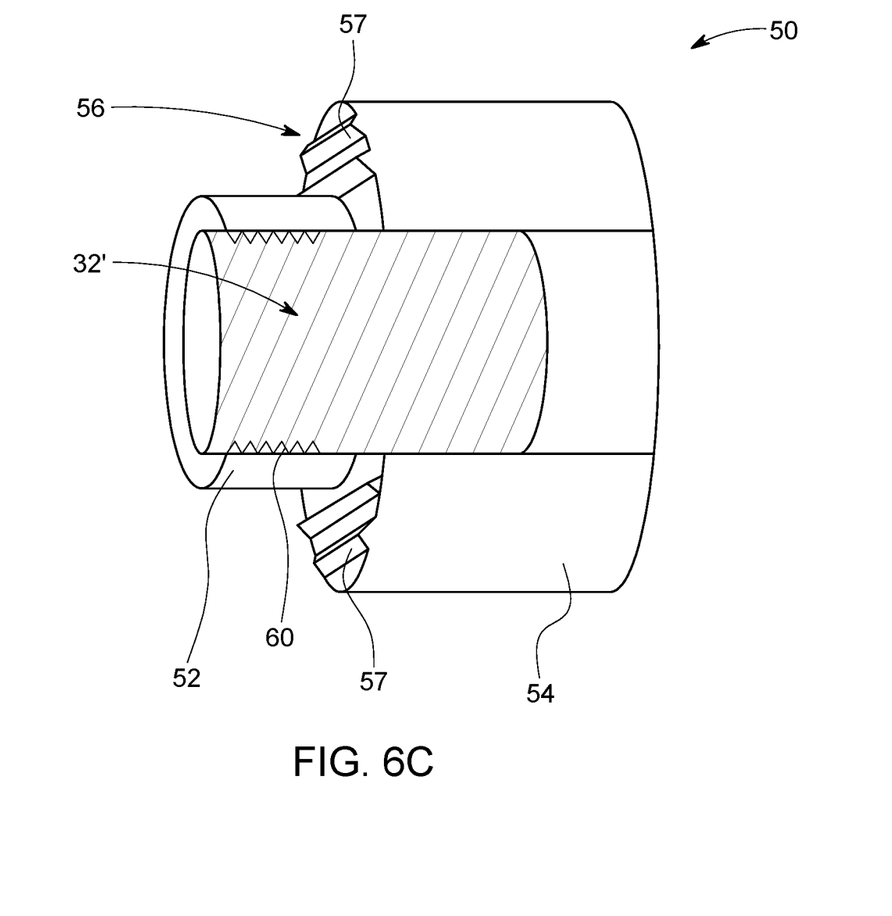
FIG. 6C illustrates the adapter ferrule of FIGS. 6A and 6B in cross-section, in accordance with one embodiment

In another embodiment as shown in FIGS. 6A-6C, and 7, an adapter ferrule 50 is provided having a smaller diameter cylinder 52 and a larger diameter cylinder 54 with a threaded recess 56 therebetween. The inside of threaded recess 56 maintains a threading 57 and the inside of smaller diameter cylinder 52 has an inside thread 60 matching the pitch and lead of AC armor 32' of cable 30. As shown in FIG. 6C, inside thread 60 of small cylinder 52 is configured to accept the helical grooves of armor 32' once cable 30 is screwed therein It is noted that inside thread 60, configured to mate with the helical grooves of armor 32' in a manner that essentially locks the threads of inside thread 60 "inside" of armor 32', i.e. between armor 32' and the cable elements inside).

As shown in FIGS. 6A-6C and FIG. 7, an outside diameter of smaller cylinder 52 is dimensioned to fit within threaded region 22 of ferrule 20 so that it can fit therewithin.

Figure 7:
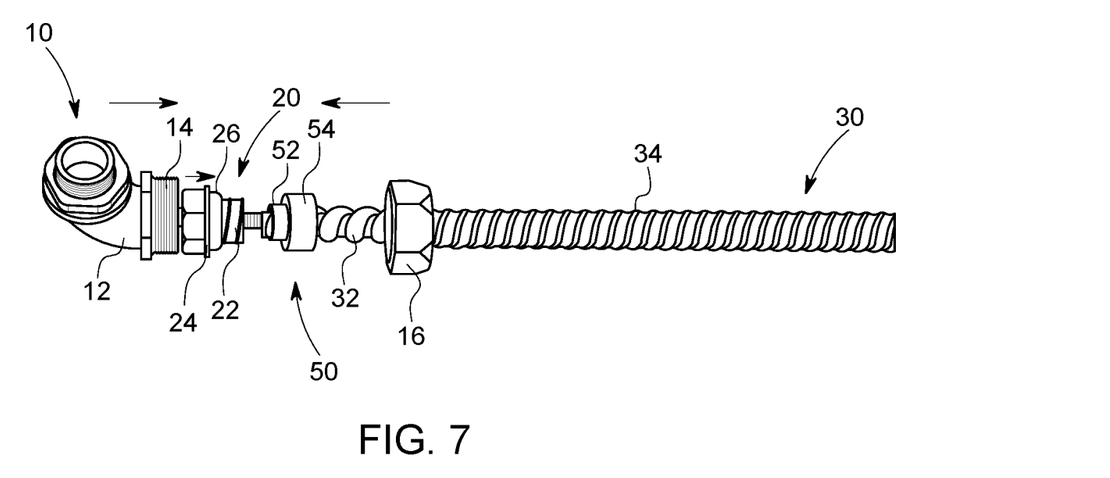
FIG. 7 illustrates a water-tight jacketed armored twisted-pair, fiber optic, or hybrid cable, with an LFMC connector and the adapter ferrule of FIGS. 6A-6C, in accordance with one embodiment.

Thus, as shown in FIG. 7, once cable 30 is connected to adapter ferrule 50 as indicated above, threaded recess 56 with threads 57 of adapter ferrule 50 is fitted over the outside NPT type threading of thread region 22 of ferrule 20 connecting ferrule 20 with adapter ferrule 50 (and cable 30). This allows threads 57 in threaded recess 56, which are matched to the pitch and dimensions of threaded region 22 to be mated with ferrule 20, so that lock nut 16 and screw onto threads 14 of connector, with adapter ferrule 50 fit entirely within the enclosure with ferrule 20. The overall outer dimension of larger diameter cylinder 54 of adapter ferrule is such that it does not interfere with the ordinary operation of lock nut 16 fitting onto nut threads 14 of connection piece 12 to complete the water-tight seal to cable 30.

Essentially, adapter ferrule 50 allows a standard twist rate AC type armor 32' to be engaged and connected to existing NPT threaded ferrule 20 without modification to the threading of either threaded region 22 or armor 32'.

Regarding the above embodiments of FIG. 4, 5, 6A-6C, and 7, such an arrangement is presented as a water-tight connection armored cable, but it may also be used for liquid-tight flexible non-metallic conduit (LFNC).

While only certain features of the invention have been illustrated and described herein, many modifications, substitutions, changes or equivalents will now occur to those skilled in the art. It is therefore, to be understood that this application is intended to cover all such modifications and changes that fall within the true spirit of the invention.

What is claimed is:

1. A connection arrangement for connecting an armored cable to a connection piece, said connection arrangement comprising:
    a ferrule, for fitting onto the end of the armored cable, said ferrule having an abutment flange, a washer and a threaded region, wherein the threaded region has at least a portion threaded according to a first thread standard; and
    a lock nut, configured to fit over said armored cable, and to connect with a nut thread on said connection piece, said lock nut and said connection piece configured to compress said ferrule therebetween forming a water-tight connection,
    wherein an armor of said armored cable has an armor thread/twist rate, where at least a portion of said armor thread/twist rate modified to match said first thread standard of said threaded region of said ferrule.

2. The connection arrangement as claimed in claim 1, wherein said first thread standard of said threaded region of said ferrule is an NPT thread standard (ANSI/ASME B1.20.1), and wherein said armor thread/twist rate of said armored cable is threaded to a standard AC armor pitch, and wherein said at least a portion of said armor with a modified thread/twist rate has an armor pitch matching said NPT thread standard (ANSI/ASME B1.20.1) at a region of connection with said threaded region of said ferrule.

3. The connection arrangement as claimed in claim 1, and wherein said armor thread/twist rate of said entire armored cable has said modified armor thread/twist rate pitch matching said NPT thread standard (ANSI/ASME B1.20.1) over at least some portion of the length of said armored cable.

4. The armored cable as claimed in claim 1, further comprising a polymer jacket over said armor of said armored cable.

5. The armored cable as claimed in claim 4, wherein said polymer jacket is water-tight.

6. The armored cable as claimed in claim 1, wherein said cable is any one of a twisted pair cable, a fiber optic cable or a hybrid cable.

7. The armored cable as claimed in claim 1, wherein said armor of said armored cable, is selected from any one of: AC armor, interlocking aluminum armor, helical steel armor, corrugated armor, and helical plastic armor; any of which may exhibit a standard AC armor pitch.

\* \* \* \* \*